(12) United States Patent
Schirrmann et al.

(10) Patent No.: US 11,340,568 B2
(45) Date of Patent: May 24, 2022

(54) TEST SYSTEM AND METHOD FOR CARRYING OUT A TEST IN A COORDINATED MANNER

(71) Applicant: Airbus Defence and Space GmbH, Taufkirchen (DE)

(72) Inventors: Arnd Schirrmann, Hamburg (DE); Omid Omidwar, Hamburg (DE)

(73) Assignee: Airbus Defence and Space GmbH

( * ) Notice: Subject to any disclaimer, the term of this patent is extended or adjusted under 35 U.S.C. 154(b) by 777 days.

(21) Appl. No.: 16/185,196

(22) Filed: Nov. 9, 2018

(65) Prior Publication Data
US 2019/0146798 A1    May 16, 2019

(30) Foreign Application Priority Data
Nov. 13, 2017  (DE) .................... 10 2017 126 561.9

(51) Int. Cl.
| | |
|---|---|
| G05B 19/042 | (2006.01) |
| B64F 5/60 | (2017.01) |
| G05B 23/02 | (2006.01) |
| G06F 9/30 | (2018.01) |
| G07C 5/08 | (2006.01) |

(52) U.S. Cl.
CPC .............. G05B 19/042 (2013.01); B64F 5/60 (2017.01); G05B 23/0208 (2013.01); G06F 9/30003 (2013.01); G07C 5/0816 (2013.01); G05B 2219/45071 (2013.01)

(58) Field of Classification Search
CPC ..... B64F 5/60; G06F 9/30003; G07C 5/0816; G05B 2219/45071; G05B 23/0208; G05B 19/042

USPC ........................................................ 702/184
See application file for complete search history.

(56) References Cited

U.S. PATENT DOCUMENTS

| | | | | |
|---|---|---|---|---|
| 5,111,402 A * | 5/1992 | Brooks | ................ | G01R 31/008 324/73.1 |
| 7,844,350 B2 * | 11/2010 | Puri | .................... | G05B 23/0208 700/30 |
| 9,521,564 B2 * | 12/2016 | Zhao | ................... | G06F 11/3664 |

(Continued)

OTHER PUBLICATIONS

De Crescenzio et al., Augmented Reality for Aircraft Maintenance Training and Operations Support, IEEE Computer Graphics and Applications, vol. 31, Dec. 2010, Issue 1, pp. 96-101. IEEE Xplore [online]. DOI: 10.1109/MCG.2011.4.

*Primary Examiner* — Quan Zhen Wang
*Assistant Examiner* — Mancil Littlejohn, Jr.
(74) *Attorney, Agent, or Firm* — Lerner, David, Littenberg, Krumholz & Mentlik, LLP (57) ABSTRACT

A test system for testing a control unit of a system includes a management server which is configured to provide predefined test instructions, a monitoring system, and a number of output units. The monitoring system is configured to convert test instructions provided by the management server into operating instructions for setting a test configuration on a control unit of a system using predefined assignment logic. The monitoring system is also configured to divide operating instructions for setting the test configuration into partial instructions for setting a partial configuration on the control unit and to temporally and/or logically classify the partial instructions. Respective output units of the number of output units are configured to output the partial instructions transmitted by the monitoring system.

14 Claims, 5 Drawing Sheets

(56) References Cited

U.S. PATENT DOCUMENTS

| | | | |
|---|---|---|---|
| 2004/0186599 A1* | 9/2004 | Ahmed | G05B 17/02 |
| | | | 700/86 |
| 2013/0166271 A1* | 6/2013 | Danielsson | G06F 30/20 |
| | | | 703/22 |
| 2016/0337053 A1 | 11/2016 | Diperna et al. | |
| 2017/0193302 A1 | 7/2017 | Mullins | |
| 2018/0365043 A1* | 12/2018 | Kaufman | G06F 9/44505 |

\* cited by examiner

TEST SYSTEM AND METHOD FOR CARRYING OUT A TEST IN A COORDINATED MANNER

FIELD OF THE INVENTION

The present invention relates to a test system for testing a control unit of a system and to a method for testing a control unit of a system.

BACKGROUND OF THE INVENTION

When producing a system, for example an aircraft, it is necessary to test a control unit of the system in order to ensure a functionality of the control unit.

In complex systems in particular, for example a cockpit of an aircraft, numerous setting operations are needed to test or check all configurations or functions of the cockpit.

A test method for such a system is very time-consuming using engineers who must manually or independently identify and set the respective control elements for setting respective configurations.

BRIEF SUMMARY OF THE INVENTION

There may therefore be a need to further improve and accelerate a sequence for testing control units.

Aspects of the present invention provides a test system for testing a control unit of a system. The test system comprises a management server which is configured to provide predefined test instructions. The test system also comprises a monitoring system which is configured to convert test instructions provided by the management server into operating instructions for setting a test configuration on a control unit of a system using predefined assignment logic. The monitoring system is also configured to divide operating instructions for setting the test configuration into partial instructions for setting a partial configuration on the control unit and to temporally and/or logically classify the partial instructions and thereby to temporally and/or logically coordinate them with one another. The monitoring system is also configured to transmit the partial instructions to a number of output units according to their temporal and/or logical classification. The test system also comprises a number of output units. Provision is made for respective output units of the number of output units to be configured to output the partial instructions transmitted by the monitoring system in order to make it possible for a number of engineers to set the test configuration on the control unit of the system in a temporally and/or logically coordinated manner.

The term "test instruction" relates to sequences, that is to say temporal and/or logical sequences for setting at least one test configuration on a control unit.

The term "test configuration" relates to a specific configuration, that is to say a specific state of control elements of a control unit or a sequence of different states of control elements of a control unit over time.

The term "operating instruction" relates to information for setting respective control elements of a control unit.

The term "partial instruction" relates to a part of an operating instruction which is provided for output on a respective output unit.

The term "assignment logic" relates to instructions for converting test instructions into operating instructions. For example, assignment logic comprises instructions for converting test instructions into operating instructions, wherein the operating instructions comprise information for identifying at least one control element, by means of which a test configuration corresponding to the test instructions can be set on a control unit.

A test configuration is set on a control unit, for example, in order to check a function of the control unit and/or a function of a system controlled by the control unit in response to the test configuration being set. In order to check a system and/or a test configuration, the test system comprises, in one example, a system interface which is configured to set the system on the basis of test instructions predefined by the management server, to capture a state of the system and to transmit the captured state of the system to the management server. In this case, the management server is also configured to check the test configuration set on the control unit using the state of the system captured by the system interface by comparing the state of the system captured by the system interface with a desired state of the system predefined for the test configuration which has been set, for example.

In one example, provision is made for respective output units of the number of output units to comprise at least one sensor and a processor, wherein the processor is configured to capture performance of a setting operation by an engineer assigned to a respective output unit and/or by a robot assigned to the respective output unit using the at least one sensor, to log it and to report it back to the monitoring system.

In one example, the operating instructions comprise information for orientation on the control unit and/or hints for operating at least one control element of the control unit.

In another example, at least one part of the number of output units is in the form of data glasses. Provision is also made for respective partial instructions corresponding to the operating instructions to comprise control commands which configure the respective output units to identify control elements on the control unit which correspond to the test configuration and to mark them in a temporally and/or logically coordinated manner.

In one example, the monitoring system is configured to automatically dynamically divide the operating instructions into a number of partial instructions on the basis of free output units and/or robots and to automatically and dynamically distribute the number of partial instructions to the output units and/or robots on the basis of respective specifications of the output units and/or robots.

In another example, the monitoring system is configured to divide the operating instructions into a number of partial instructions according to predefined temporal and/or logical information.

In one example, the test system comprises at least one user interface. The at least one user interface can be configured to receive information transmitted by the output unit and/or the management server as an intermediate station and to output it on an output unit and/or to edit it.

A user interface makes it possible for an engineer to monitor and possibly change a test which is running in an automatic or semiautomatic manner and runs using the test system.

An aspect of the invention also provides a method for testing a control unit of a system using a test system. The method comprises the following steps of:
a) providing predefined test instructions by means of a management server;
b) converting the test instructions provided by the management server into operating instructions for setting a test configuration on a control unit of a system using predefined assignment logic by means of a monitoring system;

c) classifying the operating instructions as temporal and/or logical partial instructions;

d) transmitting the partial instructions to a number of output units on the basis of the temporal and/or logical classification carried out in step c);

e) setting the test configuration on the control unit on the basis of test instructions predefined by the management server by means of the output unit.

According to one example, the method also comprises the steps of:

f) capturing and forwarding a state of the system to the management server by means of a system interface in response to the test configuration being set on the control unit;

g) checking the test configuration set on the control unit using the state of the system captured by the system interface by means of the management server.

An aspect of the present invention is used, in particular, to supply output units with operating instructions in a coordinated manner in order to perform test instructions of a test on a system. A monitoring unit is provided for this purpose, which monitoring unit subdivides the test instructions into partial instructions and transmits them to respective output units in a temporally and/or logically coordinated manner, that is to say in a manner temporally and/or logically matched to one another. In order to subdivide the predefined test instructions into the partial instructions, the monitoring unit may use a predefined scheme or may dynamically carry out an allocation or division on the basis of a current state and/or on the basis of properties of respective output units.

These and further aspects of the present invention will become clear with reference to the embodiments described below.

BRIEF DESCRIPTION OF THE DRAWINGS

Exemplary embodiments of the invention are described below with reference to the following drawings. In the drawings, identical features are indicated by means of identical reference signs.

DETAILED DESCRIPTION

Figure 1:
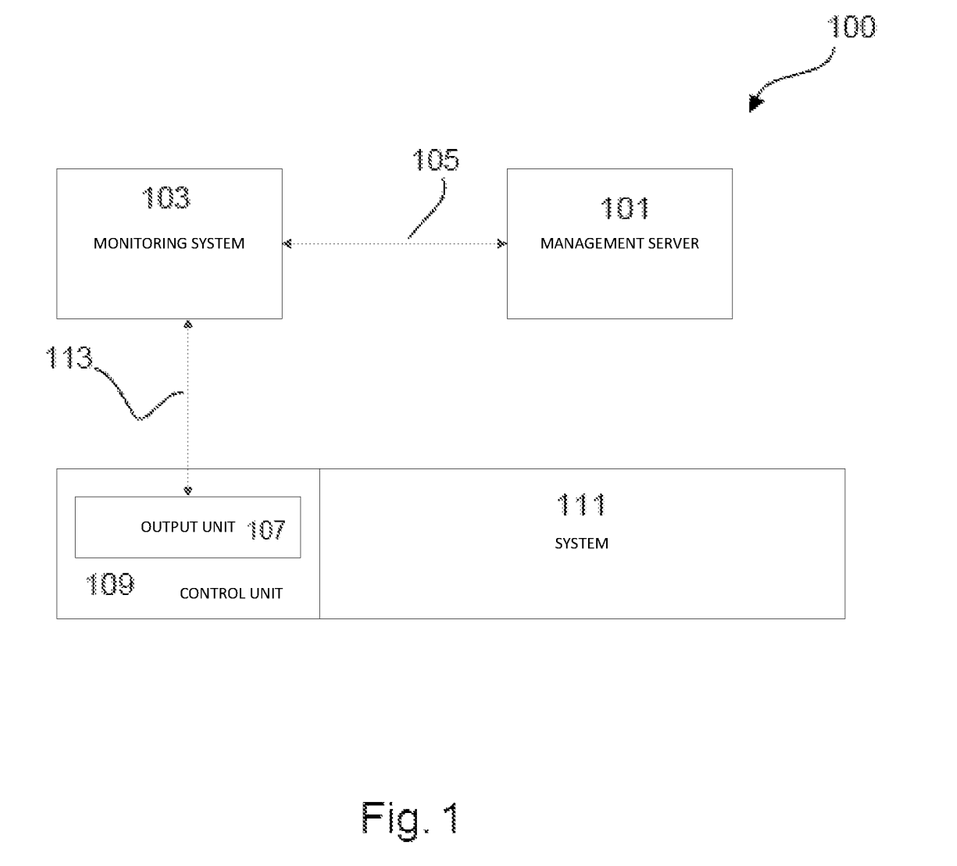
FIG. 1 shows a schematic illustration of an example of a test system.

FIG. 1 shows a test system 100 having a management server 101 which is communicatively connected to a monitoring system 103, as indicated by arrow 105. The management server 101 can be connected to the monitoring system 103 via a wired or a wireless communication interface, for example.

The management server 101 is provided with test instructions, for example so-called "Ground Testing Instructions", by a source, for example a database or an engineer. The test instructions may comprise, for example, information relating to which control elements on a control unit 109 of a system 111, of an aircraft in this case, are to be set in which order with which parameters for a respective test configuration.

The management server 101 transmits those test instructions provided by the source to the monitoring system 103.

The monitoring system 103 converts the test instructions transmitted by the management server 101 into operating instructions for setting control elements on the control unit 109 according to the test configuration. For this purpose, the monitoring system uses predefined assignment logic and assigns corresponding operating instructions to respective test instructions.

For example, provision may be made for the monitoring system 103 to assign, to a test instruction "switch on control unit", an operating instruction which comprises a control command which causes an output unit 107, which may be in the form of data glasses for example, to be configured to identify and mark, that is to say to display, in a manner highlighted in colour for example, a control element which is to be used to switch on the control unit 109. Accordingly, an engineer using the output unit 107 can quickly identify the control element as such and can set it according to the operating instructions which, for example, are displayed as additional information on the output unit 107.

The monitoring system 103 can communicate with the output unit 107 via a wired or a wireless communication connection, as indicated by arrow 113.

Figure 2:
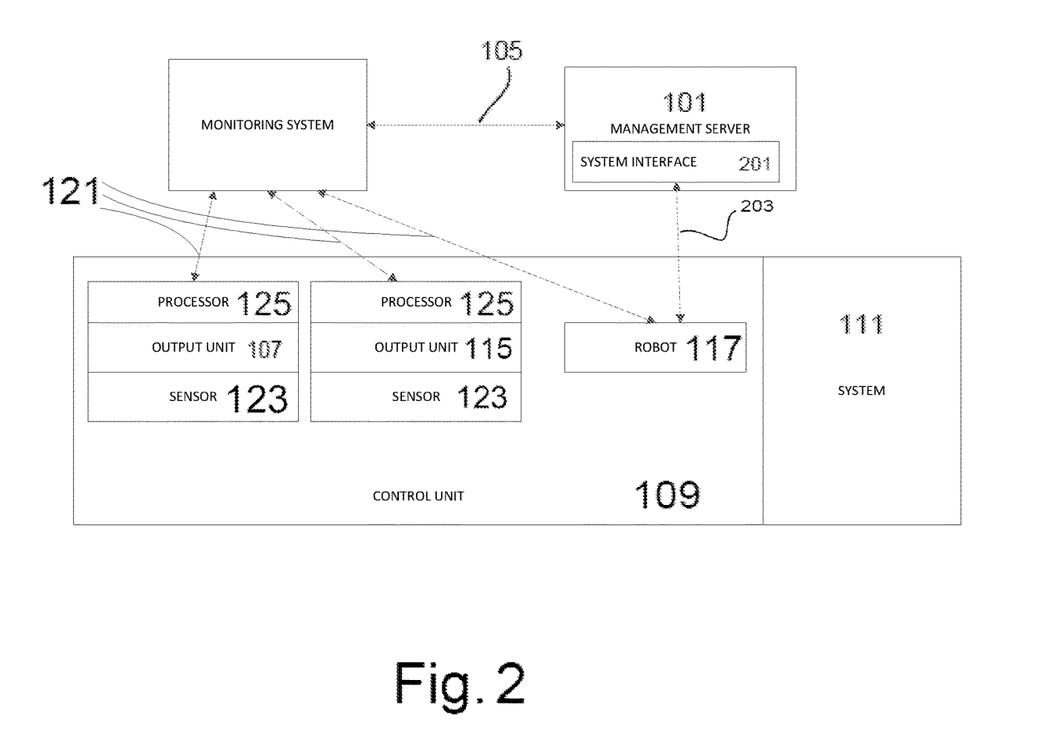
FIG. 2 shows a schematic illustration of an example of a test system having a multiplicity of output units.

FIG. 2 shows a test system 200. The test system 200 is based on the test system 100, but additionally comprises an output unit 115 and a robot 117.

When using a multiplicity of output units 107, 115, the monitoring system 103 can be configured to coordinate different operating instructions between respective output units 107, 115 and execution entities, such as the robot 117, that is to say to temporally and/or logically divide respective operating instructions into partial instructions for respective output units 107, 115 and the robot 117 and to transmit the respective partial instructions to the respective output units 107, 115 and the robot 117 in a manner temporally and/or logically matched to one another, as indicated by arrows 121. For this purpose, provision may be made for respective partial instructions of an operating instruction to be divided among the output units 107, 115 and the robot 117 by the monitoring system 103 in a sequence, with the result that engineers using the output units 107, 115 and possibly the robot 117 set one or more test configurations on the control unit 109 together and in a manner temporally and/or logically matched to one another.

Each of output units 107 and 115 comprises a sensor 123 and a processor 125.

In order to match respective partial instructions for respective output units 107, 115 and for the robot 117 to one another, the monitoring system 103 can assign the operating instructions to the output units 107, 115 and to the robot 117 according to a predefined scheme. Alternatively, the monitoring system 103 can dynamically divide or distribute the operating instructions among the output units 107, 115 and the robot 117, for example on the basis of a current availability and/or respective properties of the output units 107, 115 or of the robot 117. For this purpose, the monitoring system 103 may use, for example, a list of properties of the engineers using the output units 107, 115 or of respective properties of engineers using the output units 107, 115 and of properties of the robot 117, in which properties, for example usable tools, a range and/or a status of the engineers using the output units 107, 115 are stored.

For example, operating instructions and corresponding partial instructions may comprise control commands for orientation when setting a test configuration on the control unit 109. This means that the operating instructions can comprise, for example, information relating to a form and/or a function of a respective control element.

The operating instructions may also comprise, for example, information relating to the position at which, for example the coordinate in a spatial coordinate system at which, a respective control element can be found on the control unit 109 and relating to the position at which a control element should be set according to a respective test configuration.

The operating instructions may also comprise, for example, information relating to a digital model of the control unit 109 and/or of the system 111. Accordingly, provision may be made, for example, for information relating to an environment captured by means of a sensor (not illustrated here) to be compared with the digital model in order to identify and set respective control elements.

The test system 200 is used, in particular, to check an aircraft in a ground test after final manufacture and to reduce checking steps to be manually carried out by one or more engineers.

In one example, provision may be made for the output units 107, 115 and the robot 117 to interchange information with one another via wireless communication interfaces and/or wired communication interfaces. Accordingly, the output units 107, 115 and the robot 117 can be temporally and/or logically synchronized with one another.

Figure 3:
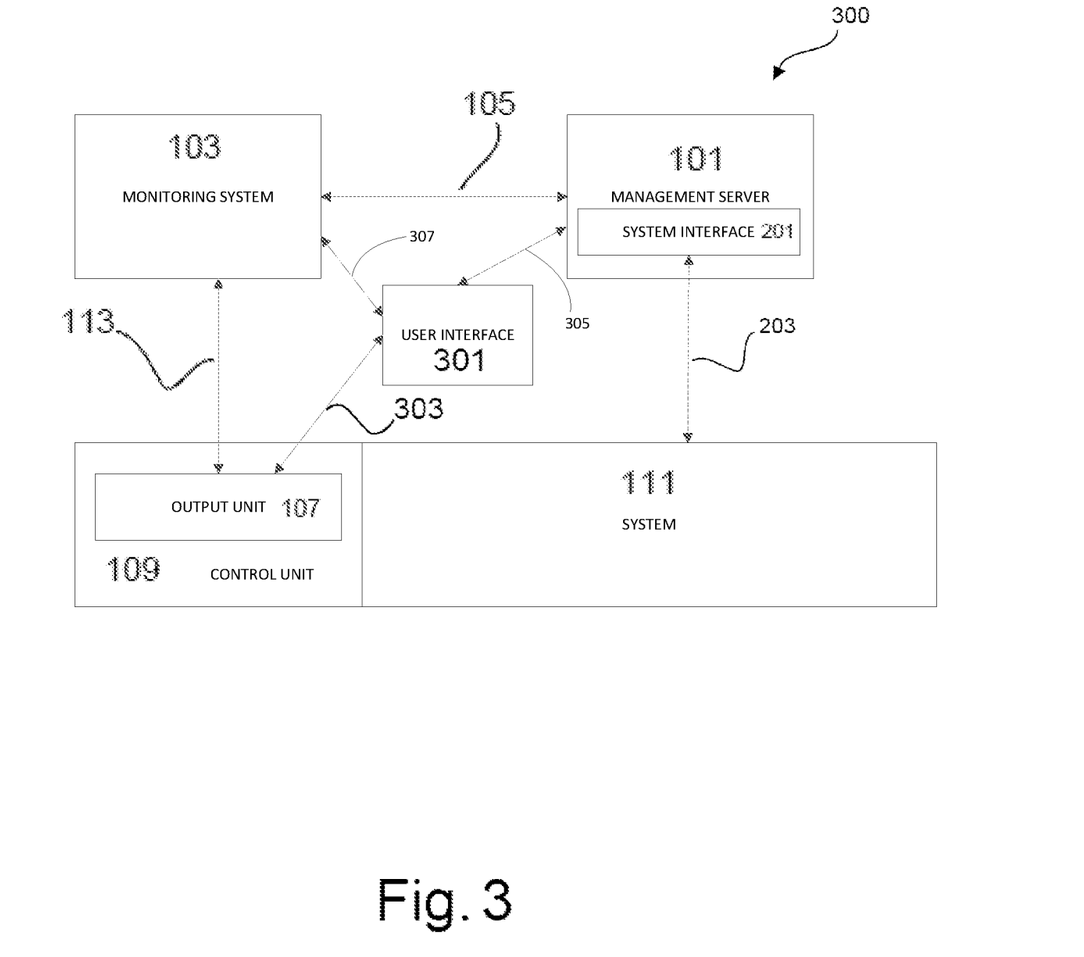
FIG. 3 shows a schematic illustration of an example of a test system having a system interface and a user interface.

FIG. 3 shows a test system 300. The test system 300 is based on the test system 100 and additionally comprises a system interface 201 and a user interface 301. In this case, the system interface 201 is configured as part of the management server 101. However, the system interface 201 can also be configured as a separate unit or as part of the monitoring system 103.

The system interface 201 is communicatively connected to the aircraft 111, as indicated by arrow 203. For this purpose, the system interface 201 can interchange data with the aircraft 111 in a wired or wireless manner.

For example, the system interface 201 is used to set and/or capture a state on the aircraft 111. For this purpose, the system interface can access control devices of the aircraft 111, for example.

The system interface 201 can be in the form of a so-called "digital equipment simulator", for example.

In order to check a respective test configuration set on the control unit 109, the system interface 201 can set a predefined state on the aircraft 111 and/or can read a current state of the aircraft 111 and can transmit it to the management server 101. On the basis of information relating to a state of the aircraft 111 transmitted to the management server 101, the management server 101 can compare the current test configuration of the control unit 109, which may be a control panel or a "cockpit" of the aircraft 111 for example, with the state of the aircraft 111 and can thereby check a function of the test configuration currently set on the control unit 109.

The system interface 201 can be used to capture interaction between the aircraft 111 and the control unit 109.

The user interface 301 may be in the form of a mobile computing unit or a stationary system, for example. It goes without saying that the user interface 301 may also be integrated in the management server 101 or the monitoring system 103.

The user interface 301 may be communicatively connected to the output unit 107 in a wired or wireless manner, as indicated by arrow 303.

As a result of a communication connection between the user interface 301 and the output unit 107, a current state, for example an operating instruction currently assigned to the output unit 107, can be displayed to a user, for example an engineer, and/or can be edited by the user using the user interface 301.

As a result of a communication connection between the user interface 301 and the management server 101, a current test instruction can be displayed to a user, for example an engineer, and/or can be edited by the user using the user interface 301.

Furthermore, as a result of a communication connection between the user interface 301 and the management server 101, a state of the aircraft 111 can be displayed and/or edited using the system interface 201.

As a result of a communication connection between the user interface 301 and the monitoring system 103, conversions of test instructions into operating instructions, which are carried out by the monitoring system 103, and/or assignments of respective partial instructions to respective output units 107, which are carried out by the monitoring system 103, can be displayed to a user, for example an engineer, and/or can be edited by the user using the user interface 301.

The user interface 301 can be communicatively connected to a multiplicity of test systems or a multiplicity of output units and/or a multiplicity of management servers and/or a multiplicity of monitoring systems in order to make it possible for a user to centrally monitor and/or control a multiplicity of test procedures for a multiplicity of systems, for example.

Figure 4:
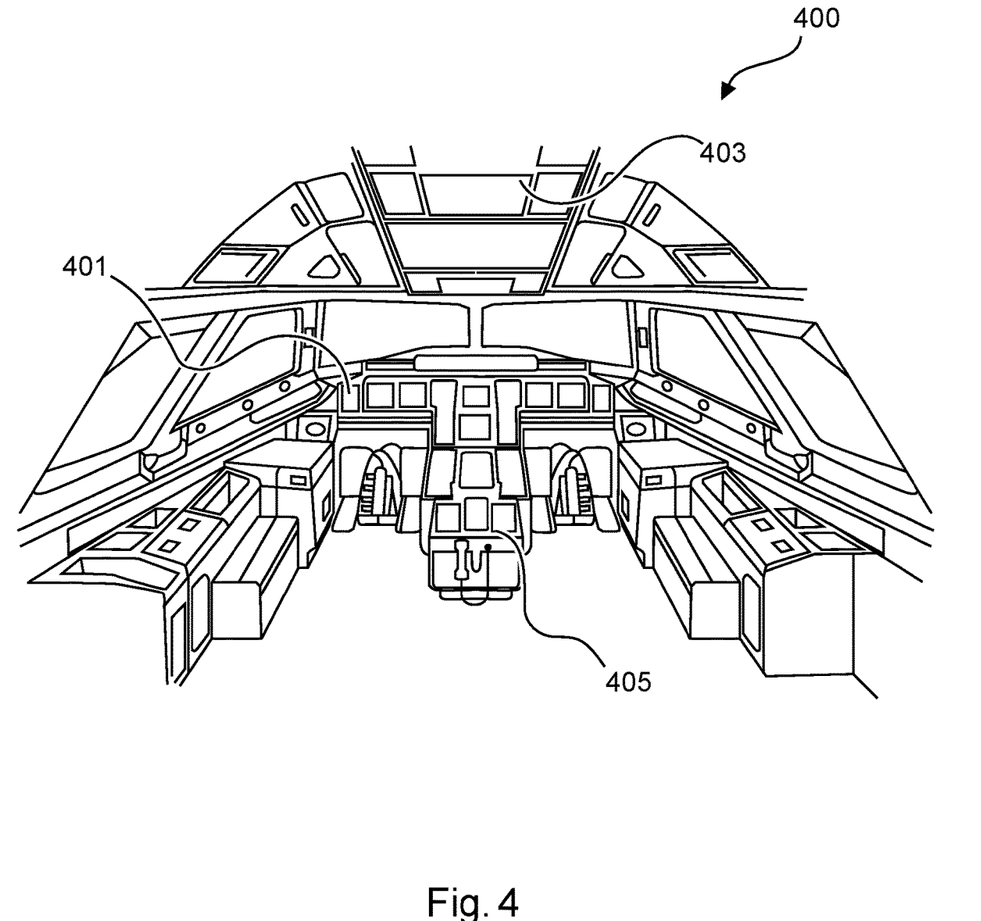
FIG. 4 shows a schematic illustration of an output of partial instructions by means of an output unit.

FIG. 4 shows a schematic illustration of an output of partial instructions by means of an output unit from the perspective of an engineer. This means that the scene illustrated in FIG. 4 is displayed on the output unit. For this purpose, the output unit captures an actual scene, that is to say the cockpit 400, by means of a sensor and displays the scene on an output unit. Information which, according to respective operating instructions, relate to control elements which are intended to be set or read is displayed on the output unit in a manner superimposed on the information recorded using the sensor. In the example illustrated in FIG. 4, the control elements 401, 403 and 405 are illustrated in a highlighted manner, in which case the control elements 401, 403 and 405 are each highlighted in different colours.

In one example, the control elements 401 are displayed as a partial instruction on a first output unit, the control elements 403 are displayed as a partial instruction on a second output unit and the control elements 405 are displayed as a partial instruction on a third output unit. In this case, the control elements 401 can be displayed on the first output unit temporally before the control elements 405 on the third output unit, with the result that an engineer using the first output unit will first of all set the control elements 401 and an engineer using the third output unit will temporally subsequently set the control elements 405. Accordingly, the engineer using the first output unit 401 and the engineer using the third output unit 405 act in a temporally exactly matched sequence and execute a complex control operation which is not possible for an individual engineer, for example.

In one example, provision is made for the control elements 405 to be displayed in a highlighted manner or marked on the third output unit only or only when the control elements 401 have been set by the engineer using the first output unit according to his respective partial instructions. For this purpose, a monitoring system which transmits the partial instructions to the output units may be configured, for example, to transmit respective partial instructions for respective output units only when a respectively preceding step according to a predefined sequence has been confirmed. The monitoring system can request a corresponding confirmation by means of a system interface or can receive it as feedback from a respective output unit.

In one example, an operating instruction or partial instruction performed by an engineer or by a robot can be captured by means of a sensor included in an output unit and can be fed back to a communication partner, for example the monitoring system.

Provision may also be made for the monitoring system to coordinate further operating instructions on the basis of respective feedback from an output unit.

Figure 5:
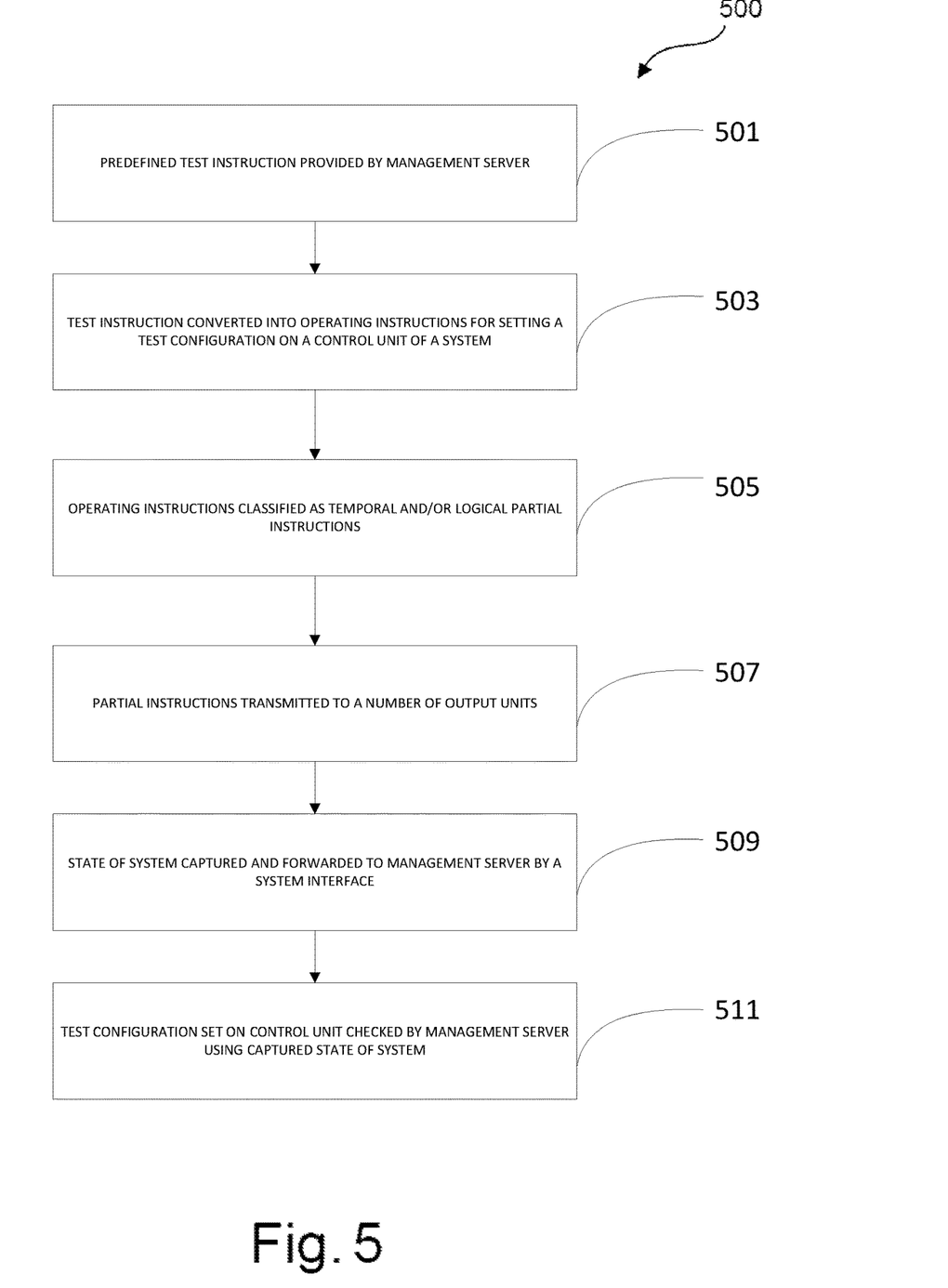
FIG. 5 shows a schematic illustration of an example of a method for testing a control unit of a system using an example of a test system.

FIG. 5 shows an example of a method 500 for testing a control unit of a system using a test system. The method 500 comprises the following steps:

In a first step 501, also referred to as step a), a predefined test instruction is provided by a management server.

In a second step 503, also referred to as step b), the test instructions provided by the management server are converted into operating instructions for setting a test configuration on a control unit of a system using predefined assignment logic by means of a monitoring system.

In a third step 505, also referred to as step c), the operating instructions are classified as temporal and/or logical partial instructions.

In a fourth step 507, also referred to as step d), the partial instructions are transmitted to a number of output units on the basis of the temporal and/logical classification performed in step c).

In an optional fifth step 509, also referred to as step e), a state of the system is captured and is forwarded to the management server by means of a system interface in response to the test configuration being set on the control unit.

In an optional sixth step 511, also referred to as step f), the test configuration set on the control unit is checked by the management server using the state of the system captured by the system interface.

According to another aspect, the invention relates to a computer program element for controlling a test system, as described above, and to a computer-readable medium, for example a CD-ROM or a USB stick, on which the program element is stored. The computer program element can be distributed on a suitable medium, for example a read-only memory, for example together with hardware elements or in other forms, for example via the Internet or other wired or wireless communication protocols.

Furthermore, the computer program element can be loaded into a main memory of a processor in a computer network, for example, and can be executed in order to carry out the method described above.

It is pointed out that embodiments of the invention are described with respect to different subjects. In particular, some embodiments are described with respect to the method claims, while other embodiments are described with respect to the apparatus claims. However, a person skilled in the art in the technical field will gather from the description mentioned above and below that, unless noted otherwise, in addition to any combination of the features of one subject, any combination of the features which relate to different subjects is also considered to be disclosed in this application. However, all features can be combined with one another and thereby provide synergistic effects which are more than a simple summation of the features.

Although the invention has been illustrated and described in detail in the figures and the above description, such an illustration and description should be considered for illustration purposes or exemplary and not restrictive. The invention is not restricted to the embodiments disclosed. Further variations of the embodiments disclosed can be understood and effected by a person skilled in the art in the technical field by studying the figures, the disclosure and the dependent claims.

In the claims, the word "comprising" does not exclude any other elements or steps and the indefinite article "a" or "an" does not exclude a multiplicity. A single apparatus or other unit can perform the functions of different subjects mentioned in the claims. The mere fact that particular steps are recited in mutually exclusive dependent claims does not indicate that a combination of these steps cannot be advantageously used. Any reference signs in the claims are not to be regarded as a limitation of the scope of protection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A test system for testing a control unit of a system, wherein the test system comprises:
a management server configured to provide predefined test instructions;
a monitoring system configured to convert test instructions provided by the management server into operating instructions for setting a test configuration on a control unit of a system using predefined assignment logic, wherein the monitoring system is also configured to divide operating instructions for setting the test configuration into partial instructions for setting a partial configuration on the control unit and to temporally and/or logically classify the partial instructions and thereby to temporally and/or logically coordinate them with one another,
wherein the monitoring system is also configured to transmit the partial instructions to a number of output units according to their temporal and/or logical classification; and
a number of output units, wherein the one or more output units of the number of output units are configured to output the partial instructions transmitted by the monitoring system in order to make it possible for a number of engineers to set the test configuration on the control unit of the system in a temporally and/or logically coordinated manner.

2. The test system according to claim 1, wherein the one or more output units of the number of output units comprise at least one sensor and a processor, wherein the processor is configured to capture performance of a setting operation by an engineer assigned to a respective output unit and/or by a robot assigned to the respective output unit using the at least one sensor, to log the performance and to report the performance back to the monitoring system.

3. The test system according to claim 1, wherein the monitoring system is also configured to transmit at most one part of the partial instructions to at least one robot and to transmit a remaining part of the partial instructions to the number of output units.

4. The test system according to claim 1, wherein the test system comprises a system interface configured to set the system on the basis of test instructions predefined by the management server, to capture a state of the system and to transmit the captured state of the system to the management server, and wherein the management server is also configured to check the test configuration set on the control unit using the state of the system captured by the system interface.

5. The test system according to claim 1, wherein the operating instructions comprise information for orientation on the control unit and/or hints for operating at least one control element of the control unit.

6. The test system according to claim 1, wherein at least one part of the number of output units is in the form of data glasses, and wherein
   respective partial instructions corresponding to the operating instructions comprise control commands which configure the respective output units to identify control elements on the control unit which correspond to the test configuration and to mark them in a temporally and/or logically coordinated manner.

7. The test system according to claim 1, wherein the monitoring system is configured to divide the operating instructions into a number of partial instructions according to predefined temporal and/or logical information.

8. The test system according to claim 1, wherein the monitoring system is configured to automatically dynamically divide the operating instructions into a number of partial instructions on the basis of free output units and/or robots and to automatically and dynamically distribute the number of partial instructions to the output units and/or robots on the basis of respective specifications of the output units and/or robots.

9. The test system according to claim 1, wherein the operating instructions comprise information for temporally and/or logically performing control operations for setting the test configuration on the control unit.

10. The test system according to claim 1, wherein the control unit is a control panel of an aircraft arranged in a cockpit.

11. The test system according to claim 1, wherein the test system comprises at least one user interface, wherein the at least one user interface is configured to receive information transmitted by the number of output units and/or the management server as an intermediate station and to output it on an output unit and/or to edit it.

12. A non-transitory computer-readable medium on which a program element for controlling a test system according to claim 1 is stored, wherein the program element, when executed by one or more processors, cause the one or more processors to:
   a) provide predefined test instructions by a management server;
   b) convert the test instructions provided by the management server into operating instructions for setting a test configuration on a control unit of a system using predefined assignment logic by a monitoring system;
   c) divide the operating instructions into partial instructions for setting a partial configuration on the control unit and classify the partial instructions as temporal and/or logical partial instructions; and
   d) transmit the partial instructions to a number of output units on the basis of the temporal and/or logical classification carried out in step c).

13. A method for testing a control unit of a system using a test system, comprising:
   a) providing predefined test instructions by a management server;
   b) converting the test instructions provided by the management server into operating instructions for setting a test configuration on a control unit of a system using predefined assignment logic by a monitoring system;
   c) dividing the operating instructions into partial instructions for setting a partial configuration on the control unit and classifying the partial instructions as temporal and/or logical partial instructions; and
   d) transmitting the partial instructions to a number of output units on the basis of the temporal and/or logical classification carried out in step c).

14. The method according to claim 13, wherein the method further comprises:
   e) capturing and forwarding a state of the system to the management server by a system interface in response to the test configuration being set on the control unit;
   f) checking the test configuration set on the control unit using the state of the system captured by the system interface by the management server.

* * * * *